United States Patent [19]

Bennett

[11] Patent Number: 4,842,694
[45] Date of Patent: Jun. 27, 1989

[54] APPARATUS FOR TREATING THERMOPLASTIC POLYMERS

[75] Inventor: Richard J. Bennett, Bartlesville, Okla.

[73] Assignee: Phillips Petroleum Company, Bartlesville, Okla.

[21] Appl. No.: 46,607

[22] Filed: May 7, 1987

Related U.S. Application Data

[62] Division of Ser. No. 813,348, Dec. 26, 1985, Pat. No. 4,683,290.

[51] Int. Cl.$^4$ .......................... C10B 1/04; C10B 49/14
[52] U.S. Cl. ......................... 202/219; 48/92; 202/221; 202/261; 425/472
[58] Field of Search .......................... 426/417; 264/15; 165/104.17; 126/343.5 A, 343.5 R, 347; 201/10, 11; 202/219, 221, 261; 48/92; 423/DIG. 12; 266/201, 901, 227, 236, 228, 229, 230, 242; 585/912; 208/404; 209/163, 168; 425/472

[56] References Cited

U.S. PATENT DOCUMENTS

| | | | |
|---|---|---|---|
| 1,681,808 | 8/1928 | Morgan | 201/11 |
| 1,801,263 | 4/1931 | Burnette | 126/343.5 A |
| 1,975,433 | 10/1934 | Rhodes | 126/343.5 A |
| 2,700,018 | 1/1955 | Gilbert | 201/10 |
| 3,087,840 | 4/1963 | Shaw | 432/1 |
| 3,647,358 | 3/1972 | Greenberg | 423/DIG. 12 |
| 3,747,587 | 7/1973 | McKenzie | 126/343.5 R |
| 4,328,787 | 5/1982 | Bruff et al. | 126/343.5 A |
| 4,345,900 | 8/1982 | Fahlstrom et al. | 201/11 |

FOREIGN PATENT DOCUMENTS

| | | | |
|---|---|---|---|
| 1902558 | 2/1971 | Fed. Rep. of Germany | 48/92 |
| 2012629 | 7/1973 | Fed. Rep. of Germany | 48/92 |

*Primary Examiner*—Willard Hoag
*Attorney, Agent, or Firm*—Williams, Phillips & Umphlett

[57] ABSTRACT

Apparatus for purifying, devolatilizing and/or sheeting a thermoplastic material in which a high density, flowable heat exchange material, having a density substantially above the density of the thermoplastic material and which is essentially immiscible therewith, is continuously circulated through a contact zone in a manner to maintain an extended surface area body of the high density heat exchange material in the contact zone, the thermoplastic material is introduced into and withdrawn from the contact zone in a manner to form a continuously flowing layer of the thermoplastic material across the surface of the body of high density heat exchange material. Thermoplastic material may be introduced into the contact vessel as a powder, melted in an intermediate section of the contact vessel, resolidified at the opposite end of the contact vessel and withdrawn as a sheet of thermoplastic material. Volatilizible impurities or carriers for the thermoplastic material are volatilized while the thermoplastic is being sheeted or a liquid form, solution emulsion or dispersion of the thermoplastic material may be devolatilized and purified. An apparatus is also provided in which a vessel contains the body of high density heat exchange material, the thermoplastic material is introduced above the body of high density heat exchange material or into the body of high density heat exchange material adjacent the bottom thereof and the layer of thermoplastic material is withdrawn.

2 Claims, 2 Drawing Sheets

APPARATUS FOR TREATING THERMOPLASTIC POLYMERS

This application is a division of co-pending application Ser. No. 813,348, filed Dec. 26, 1985 now U.S. Pat. No. 4,683,290, issued 7-28-1987.

The present invention relates to a method and apparatus for treating thermoplastic polymers. In a more specific aspect, the present invention relates to drying, devolatization and/or sheeting of thermoplastic polymers.

BACKGROUND OF THE INVENTION

Polymerization of monomeric materials to produce therdoplastic polymers is carried out in a variety of ways, including solution polymerization, suspension polymerization and emulsion polymerization. As a result, recovery of the polymer involves drying and/or devolatization in order to produce an intermediate product which can thereafter be formed into a final product. At the present time such drying and devolatilization is carried out by steam stripping, heating and flashing, film evaporization, extrusion devolatilization, etc. All of these methods have the common problem of being highly energy intensive and requiring expensive equipment which requires the maintenance of critical conditions and high cost of maintenance. For example, the cost of steam in steam stripping and preheating and flashing in film evaporators is quite high. However, electrical heating, such as is generally used in extrusion devolatilization, is even higher. In addition, the energy utilized to supply heat is substantially completely lost during the process, as by discharging the same to the atmosphere. Further, such polymers are often produced in powdered form (fluff) which is difficult and expensive to handle and ship to an end use location. Consequently, the polymer is generally agglomerated and pelleted for ease and economy of handling and transportation. At the present time such agglomeration and pelleting involves continuous intensive mixing, then extrusion through dies and finally cutting into pellets. During this operation, the fluff is melted for agglomeration at temperatures typically between about 100° and 450° F., usually the latter. Thus, the process is highly energy intensive and the input energy is usually vented to the atmosphere, thus resulting in substantial losses of energy. In addition, such processing equipment is expensive, difficult to operate and difficult to maintain. Further, intensive mixing and extrusion, if not properly controlled, often results in damaging the final polymer.

SUMMARY OF THE INVENTION

It is an object of the present invention to provide an improved method and apparatus for treating thermoplastic polymers, which overcomes the above and other disadvantages of the prior art. A further object of the present invention is to provide a method and apparatus for drying, devolatilization and/or sheeting of thermoplastic polymers, which reduces the energy requirements of processing. Another and further object of the present invention is to provide an improved method and apparatus for drying, devolatilization and/or sheeting of thermoplastic polymers, which utilizes simple and inexpensive equipment. Yet another object of the present invention is to provide an improved method and apparatus for drying, devolatilization and/or sheeting of polymeric materials, which utilizes equipment which is simple to operate and maintain. Another and further object of the present invention is to provide an improved method and apparatus for drying, devolatilization and/or sheeting of thermoplastic polymers, which reduces damage to the polymer.

These and other objects of the present invention are attained by circulating a body of a molten, normally-solid material, having a density significantly above the density of said thermoplastic material and which is essentially immiscible with said thermoplastic material, through a contact zone in a manner to form an in extended surface area body said molten, normally solid-material in said contact zone and continuously introducing said in thermoplastic polymer into said contact zone and withdrawing said thermoplastic polymer from said contact zone in a manner to produce a continuously flowing layer of said thermoplastic polymer across the surface of said body of molten, normally-solid material. Apparatus for the practice of the subject method includes a contact vessel adapted to maintain an extended surface area body of molten, normally-solid material therein, means for introducing molten, normally-solid material into the contact vessel, means for heating the body of molten normally solid material in the contact vessel, means for introducing a thermoplastic polymer material into the contact vessel in a manner to produce a flowing layer of the polymer on the surface of the body of molten, normally-solid material and means for withdrawing the layer of polymer from the contact vessel.

BRIEF DESCRIPTION OF THE DRAWINGS

The present invention will be best understood by reference to the accompanying drawings wherein.

DESCRIPTION OF THE PREFERRED EMBODIMENTS

Any of a wide variety of thermoplastic polymers may be treated in accordance with the present invention, including polyolefins, styrene-butadiene polymers, etc. Depending upon the purpose for which the polymer is to be treated, the polymer may be in the form of powdered polymer (fluff), liquid, a polymer solution, a polymer emulsion or a polymer suspension.

Any of a wide variety of flowable materials may be utilized in accordance with the present invention, provided only that they are liquid or molten at the lowest temperature to be employed in the process, they have a density substantially above the density of the thermoplastic polymer and they are essentially immiscible with the polymeric material. Such materials obviously include a wide variety of metals, such as tin, lead, mercury, bismuth, zinc, cadmium, sodium, potassium, lithium, etc., eutectics, such as tin-lead eutectic, and alloys, such as tin-lead-bismuth (Woods metal) tin-cadmium, etc. However, non-metallic materials, such as sulfur and the like are also useful.

Figure 1:
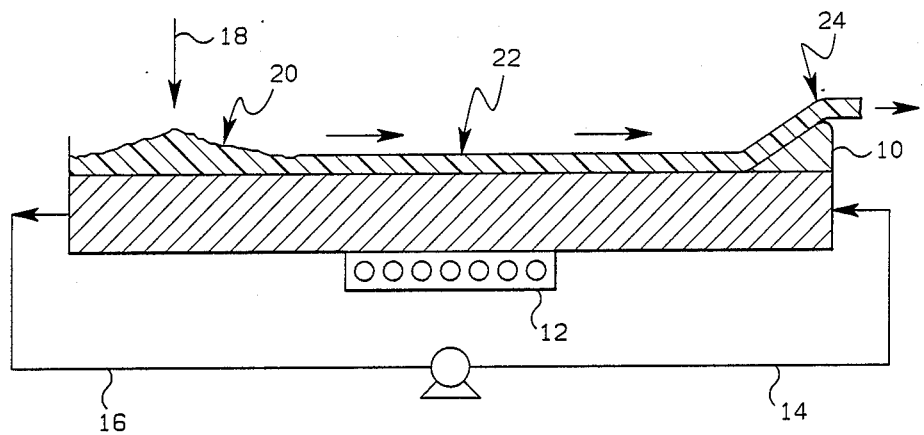
FIG. 1 is a simplified cross-sectional view of one form of apparatus useful in accordance with the present invention.

FIG. 1 of drawings is a simplified cross-sectional view of one form of apparatus in accordance with the present invention. In accordance with FIG. 1, a contact vessel 10, adapted to maintain an extended surface area body of high density, flowable material is provided. Vessel 10 is provided with a suitable heating means 12, adapted to maintain a body of high density flowable material in a fluid state and sufficient to melt the polymer. High density flowable material is continuously introduced to vessel 10 through conduit 14 and is withdrawn from vessel 10 through conduit 16. Thermoplastic polymer is introduced into vessel 10 through conduit 18 as a powdered polymer fluff 20. The polymeric material is moved across the surface of the body of high density of flowable material by applying a gas thereto or by other appropriate means, such as a moving grid or the like. As the polymeric material reaches an intermediate point in the vessel 10, it is melted to form a liquid polymer 22. As a liquid polymer moves further toward the discharge end of vessel 10, it resolidifies to form a sheet of polymer 24, which is withdrawn from the vessel in sheet form. The sheet material may thereafter be cut or otherwise formed into large particle or pellet form for transportation and use.

By way of specific example, if a polyolefin, such as polyethylene is utilized, the high density, flowable mterial would be introduced at a temperature of about 120° F. and would be heated to a temperature of about 320° F. at an intermediate point in the vessel. Thereafter, the temperature would again drop to about 120° F. Accordingly, adjacent the polymer introduction in the vessel 10, the polymer would be heated to about 100° F., to about 300° F. at the intermediate point at which it is melted and, finally, at the discharge end, would be at a temperature of about 140° F. It is estimated that in conventional processing to produce pelleted polymer from fluff, it is necessary to heat the polymer to 450° F. or a differential pressure of 350° F. By comparison, the differential temperature, in accordance with the present invention, would be about 40° F., resulting in heat energy savings of about 83%.

It should also be recognized that, during the course of forming powdered polymer into sheet form, as described above, the polymeric material would also be dried or purified to remove gaseous or liquid contaminants, which could either be withdrawn from a closed vessel or vented to the atmosphere.

It should also be recognized that the polymeric material may be introduced into vessel 10 of FIG. 1 as a liquid, emulsion, solution or suspension and purified, devolatilized and/or formed into a sheet.

Figure 2:
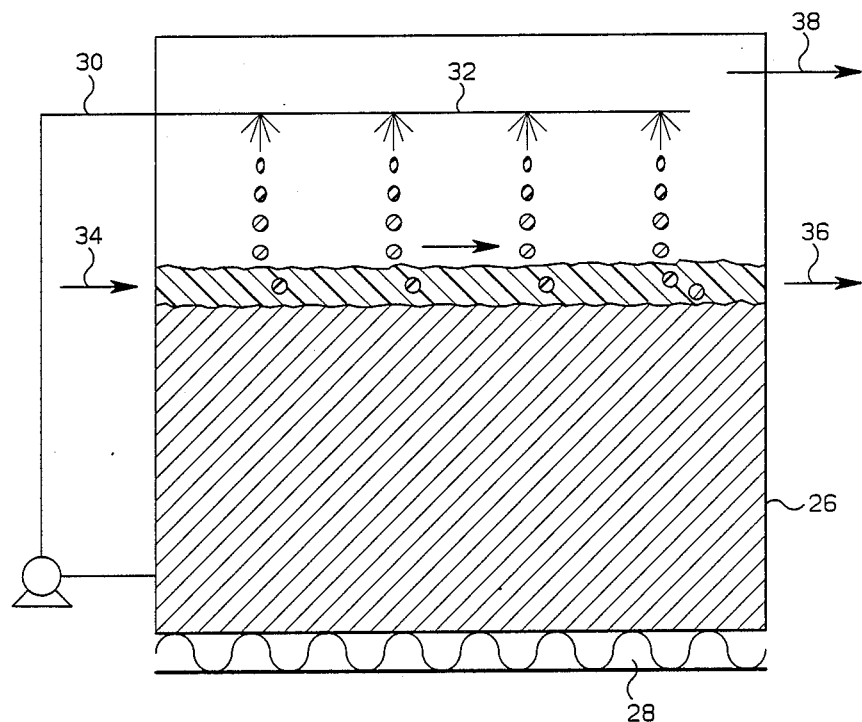
FIG. 2 is a simplified cross-sectional view of another form of apparatus useful in accordance with the present invention.

FIG. 2 of the drawings shows another form of apparatus in according with the present invention. In accordance with FIG. 2, a closed contact vessel 26 is provided. Vessel 26 is provided with a suitable heating means 28, adapted to maintain the high density flowable material in a flowable state and maintain a body of high density material in vessel 26. High density flowable material is introduced through conduit 30 and distributed above the body of material by means of a distributor means 32. Thermoplastic polymer is introduced onto the surface of the body of high density flowable material through conduit 34, flows across the body of high density flowable material and is discharged conduit 36. As the thermoplastic polymer continuously flows across the surface of the high density flowable material, high density flowable material drops downward through the layer of polymer to the body of high density material, thereby heating the same and purifying and/or devolatilizing the same, which impurities or volatile material are diacharged through conduit 38.

The apparatus of FIG. 2 can be utilized in the same manner and for the same purposes as the apparatus of FIG. 1, but obviously is most useful for drying or devolatilizing thermoplastic polymer.

Figure 3:
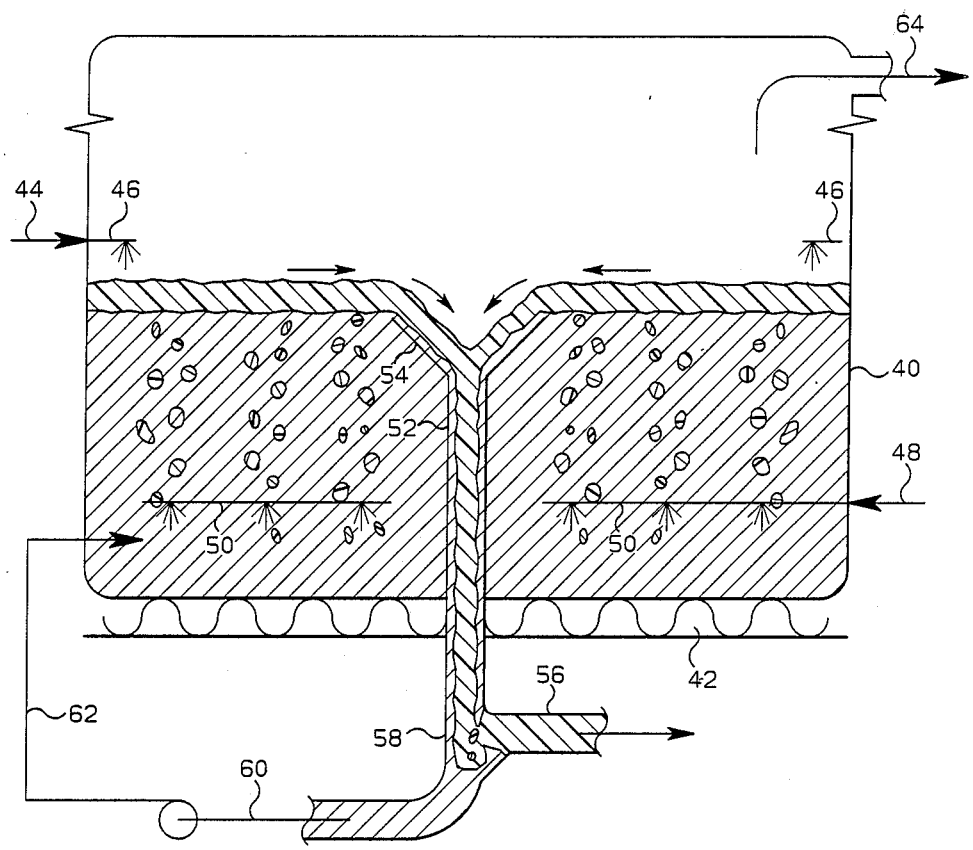
FIG. 3 is a simplified cross-sectional view of yet another apparatus useful in accordance with the present invention.

FIG. 3 of the drawings illustrates another and preferred embodiment of apparatus in accordance with the present invention. In accordance with FIG. 3, a closed contact vessel 40 is provided. Contact vessel 40 is heated by heating means 42, adapted to maintain the high density flowable material in a flowable form. Polymer is introduced into vessel 40 through line 44 and is distributed around the periphery of the vessel by distributor means 46. Alternatively, polymer may be introduced into vessel 40 through conduit 48, disposed in the body of high density flowable material, and distributed by distributor means 50. In either case, a layer of polymer will be formed on the top surface of the body of high density flowable material. Vessel 40 is also provided with a centrally-disposed conduit 52 which terminates at its upper end in a funnel-shaped inlet 54. The layer of polymer is continuously withdrawn from vessel 40 through conduit 52 and conduit 56. However, as shown in the drawing, the layer of polymeric material, together with a portion of the high density flowable material are both withdrawn through conduit 52. This mixture is then separated in a separator means 58, adapted to separate the more dense, high density flowable material from the less through conduit 60 and reintroduced into vessel 40 through conduit 62. Gaseous or other volatile materials removed from the polymer during the treatment may be removed from vessel 40 thorugh conduit 64.

While specific materials, conditions of operation, modes of operation and equipment have been referred to herein, it is to be recognized that these and other specific recitals are for illustrative purposes and to set forth the best mode only and are not to be considered limiting.

That which is claimed:

1. Apparatus adapted to devolatilize a thermoplastic polymeric material, comprising:
 (a) contact vessel means having an upper end portion and a lower end portion, wherein said contact vessel is adapted to maintain an extended surface area body of high density heat exchange material;
 (b) means for introducing into said contact vessel and withdrawing from said contact vessel said high density heat exchange material;
 (c) heating means operatively associated with said contact vessel adapted to maintain said body of high density heat exchange material in a flowable state;
 (d) means for introducing into said contact vessel and means for withdrawing from said contact vessel said thermoplastic material, wherein said means for withdrawing said thermoplastic material comprises a generally vertical conduit having an upper end portion terminating within said upper end portion of said contact vessel and a lower end portion terminating below said lower end portion of said contact vessel, said conduit is centrally located in said contact vessel and said upper end portion of said conduit defining a weir for withdrawal of said thermoplastic material and a kportion of the high density heat exchange material from said upper end portion of said contact vessel, and wherein said means for introducing said thermoplastic material into said contact vessel is at a location below said upper end portion of said centrally located conduit means, said lower end portion of said centrally located conduit includes a separator means adapted to separate said portion of said high density heat exchange material from said devolatilized thermoplastic material; and (e) means for discharging a volatile material from said upperend portion of said contact vessel.

2. Apparatus in accordance with claim 1 wherein said separator means includes a means for withdrawing said separated devolatilized thermoplastic material from said lower end portion of said conduit and recycling said separated portion of said high density heat exchange material to said contact vessel.

* * * * *